J. W. Pollock.
Wagon-Hub, Axle & Box.
Nº 75574   Patented Mar. 17, 1868.
Fig: 1.
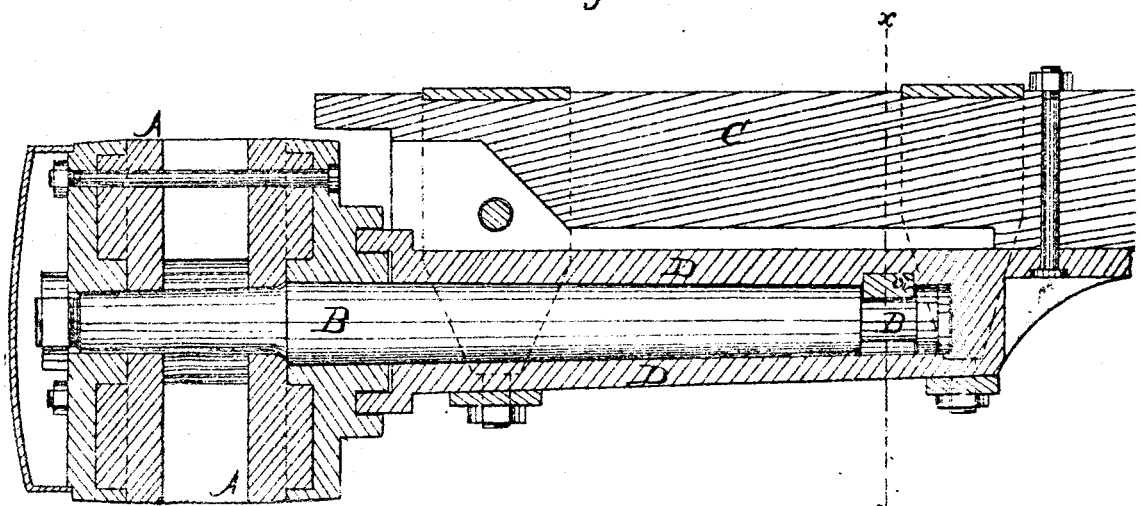
Fig. 2.
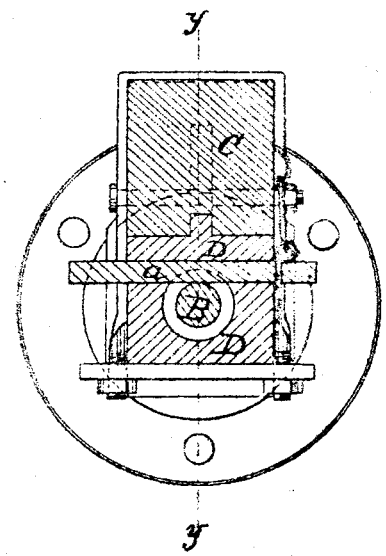
Witnesses
W. C. Aslakettrz
J. A. Fraser.
Inventor
Jno. W. Pollock
per Murry &
Attorneys.

United States Patent Office.

JOHN W. POLLOCK, OF CROSS BRIDGES, TENNESSEE.

Letters Patent No. 75,574, dated March 17, 1868.

IMPROVEMENT IN WAGON-HUB, AXLE, AND BOX.

The Schedule referred to in these Letters Patent and making part of the same.

TO ALL WHOM IT MAY CONCERN:

Be it known that I, JOHN W. POLLOCK, of Cross Bridges, in the county of Maury, and State of Tennessee, have invented new and useful Improvements in Hubs, Boxes, and Axles; and I do hereby declare that the following is a full, clear, and exact description thereof, which will enable others skilled in the art to make and use the same, reference being had to the accompanying drawings, forming part of this specification.

This invention relates to a new and improved method of constructing and combining the hubs, boxes, and axles of wheeled vehicles, whereby the same are rendered more durable and convenient.

The present invention is, in part, an improvement on the subject-matter of an invention for which Letters Patent of the United States of America have issued, or have been ordered to issue to me, and consists in the combination of the hub, which was the subject-matter of said invention, with the box and axle, as hereinafter described. In the accompanying plate of drawings—

Figure 1 represents a central longitudinal section of my invention, taken in the line $y\,y$, fig. 2.

Figure 2 represents a cross-section of the same, taken in the line $x\,x$, fig. 1.

Similar letters of reference indicate corresponding parts.

To the hub A is rigidly secured a metallic spindle, B, as shown in the drawing, fig. 1, and to the under side of any wooden or iron axle, C, is firmly secured by clamps, as shown, the box D. The box D may be made of one piece, similar to the pipe-boxes now commonly in use, or the same may be in two parts, with Babbit or other soft metal upon the inside. The spindle C rotates within the box D, and has, near the end of the same, within the box D, a groove, as shown, and through the box D is a key-way, to receive the key $a$, as shown, in such a manner that the spindle B will be held within the box D by the key $a$, at the same time that a rotating motion is permitted to the spindle B and the hub A, attached to said spindle B.

I claim as new, and desire to secure by Letters Patent—

1. The combination of the hub A and the box D with each other, and with the axle C, substantially as shown and described, and for the purposes set forth.

2. The combination of the box D with the axle C, substantially as shown and described, and for the purposes set forth.

The above specification of my invention signed by me, this      day of      , 1867.

JOHN W. POLLOCK.

Witnesses:
   A. BOWEN,
   SAM'L. F. MAYES.